United States Patent
Poubel Orenstein et al.

(10) Patent No.: US 11,541,909 B1
(45) Date of Patent: Jan. 3, 2023

(54) DETECTION OF OBJECT AWARENESS AND/OR MALLEABILITY TO STATE CHANGE

(71) Applicant: Zoox, Inc., Foster City, CA (US)

(72) Inventors: Leonardo Poubel Orenstein, San Matea, CA (US); Prateek Chandresh Shah, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 88 days.

(21) Appl. No.: 17/006,679

(22) Filed: Aug. 28, 2020

(51) Int. Cl.
*B60W 60/00* (2020.01)

(52) U.S. Cl.
CPC .... *B60W 60/0027* (2020.02); *B60W 60/0011* (2020.02); *B60W 2554/4045* (2020.02); *B60W 2554/4046* (2020.02); *B60W 2556/10* (2020.02)

(58) Field of Classification Search
CPC ......... B60W 60/0027; B60W 60/0011; B60W 2554/4045; B60W 2554/4046; B60W 2556/10
See application file for complete search history.

(56) References Cited

U.S. PATENT DOCUMENTS

| | | | |
|---|---|---|---|
| 2017/0190334 A1* | 7/2017 | Zelman | B60W 30/18145 |
| 2018/0011496 A1* | 1/2018 | Fairfield | G08G 1/167 |
| 2020/0089246 A1* | 3/2020 | McGill, Jr. | G06N 5/046 |
| 2020/0356828 A1* | 11/2020 | Palanisamy | G05D 1/024 |
| 2021/0347380 A1* | 11/2021 | Player | G06F 17/11 |

OTHER PUBLICATIONS

Erik Ward, Probabilistic Model for Interaction Aware Planning in Merge Scenarios, IEEE. Jun. 2017 (Year: 2017).*

* cited by examiner

*Primary Examiner* — James J Lee
*Assistant Examiner* — Alexander George Matta
(74) *Attorney, Agent, or Firm* — Lee & Hayes, P.C.

(57) ABSTRACT

Determining whether another entity is coordinating with an autonomous vehicle and/or to what extent the other entity's behavior is based on the autonomous vehicle may comprise determining a collaboration score and/or negotiation score based at least in part on sensor data. The collaboration score may indicate an extent to which the entity is collaborating with the autonomous vehicle to navigate (e.g., a likelihood that the entity is increasingly yielding the right of way to the autonomous vehicle based on the autonomous vehicle's actions). A negotiation score may indicate an extent to which behavior exhibited by the entity is based on actions of the autonomous vehicle (e.g., how well the autonomous vehicle and the entity are communicating with their actions).

17 Claims, 7 Drawing Sheets

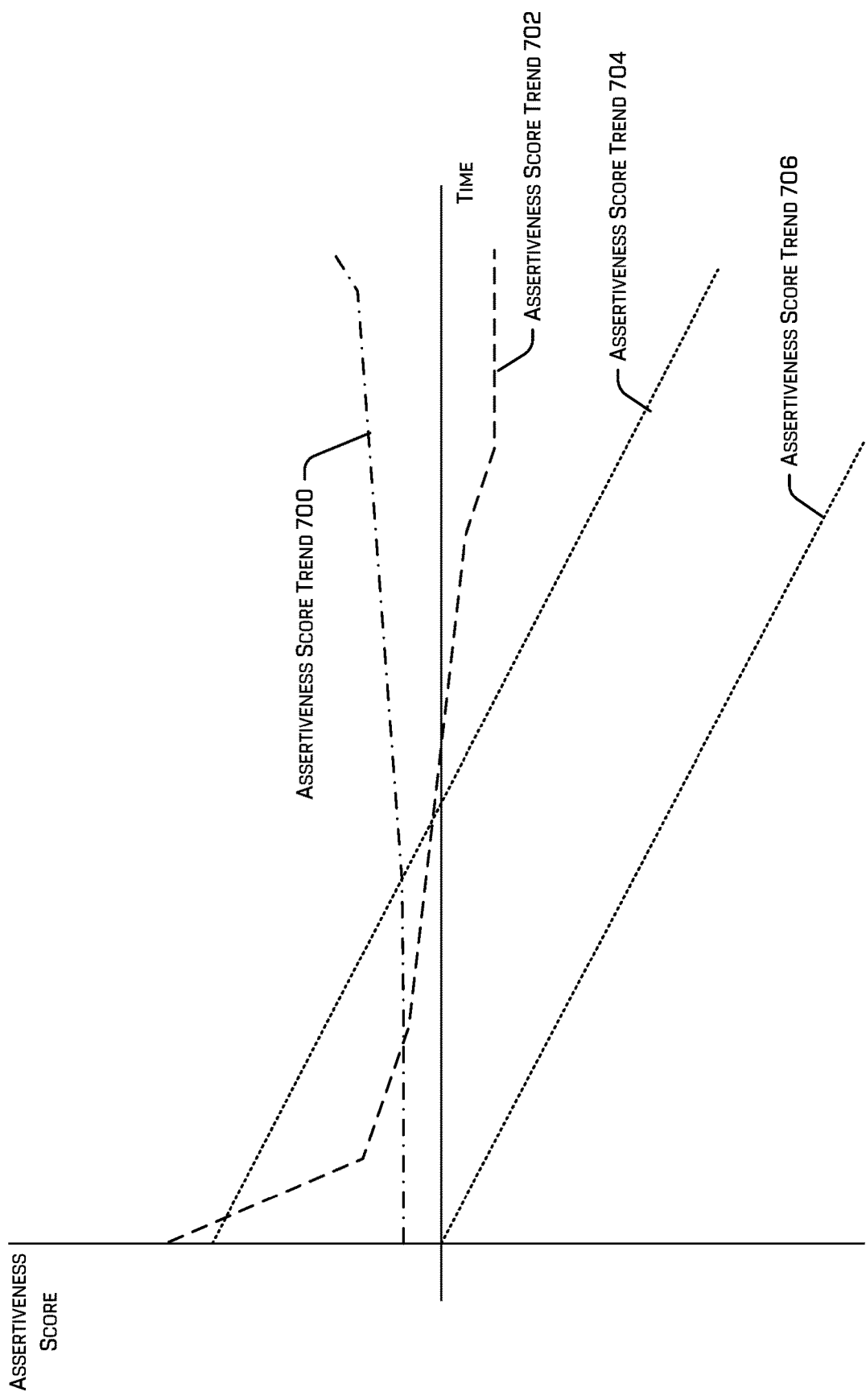

DETECTION OF OBJECT AWARENESS AND/OR MALLEABILITY TO STATE CHANGE

BACKGROUND

Despite advances in autonomous robotic control, autonomous vehicles may navigate inefficiently or in a way that may appear clunky or unnatural to a human, particularly in situations that would normally require human inference or intuition. For example, autonomous vehicles may navigate inefficiently or awkwardly in "will you go or will I go" situations where multiple vehicles may have the right of way and it may be ambiguous as to which vehicle should assert having the right of way. In another example, a human might execute a turn because the human's subjective perception that an oncoming vehicle is slowing for them, whereas an autonomous vehicle may choose to stop instead of executing a turn before an oncoming vehicle. These types of interactions may be inefficient, which may prolong ride times, contribute to extra wear and tear on the vehicle from unnecessary braking or idling, contribute to traffic delays, and may even increase the risk of a collision in some limited cases.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIGS. 6 and 7 illustrate graphs of assertiveness scores over time for different scenarios.

DETAILED DESCRIPTION

Figure 1:
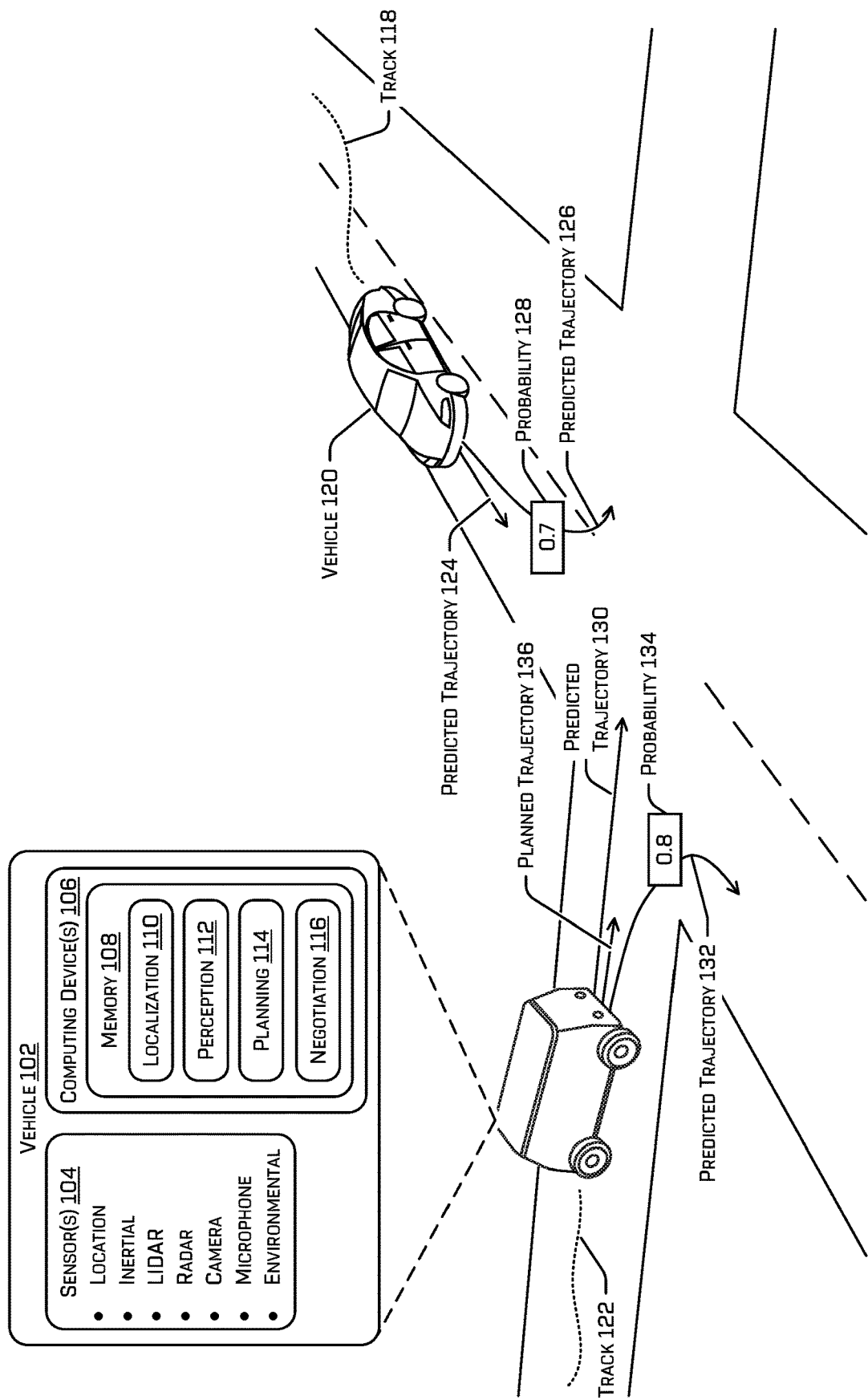
FIG. 1 illustrates an example scenario in which an autonomous vehicle may be controlled based at least in part on determining an intent score, assertiveness score, negotiation score, and/or collaboration score.

Techniques (e.g., processes, machines) for determining whether another entity is coordinating with an autonomous vehicle and/or to what extent the other entity's behavior is based on the autonomous vehicle may comprise determining a collaboration score and/or negotiation score based at least in part on sensor data. A collaboration score may indicate an extent to which the entity is collaborating with the autonomous vehicle to navigate (e.g., a likelihood that the entity is increasingly yielding the right of way to the autonomous vehicle based on the autonomous vehicle's actions or that the autonomous vehicle's behavior is causing the entity to increase assertion of the right of way). A negotiation score may indicate an extent to which behavior exhibited by the entity is based on actions of the autonomous vehicle (e.g., how well the autonomous vehicle and the entity are communicating with their actions).

In some examples, determining the collaboration score and/or the negotiation score may be based at least in part on determining an intent score associated with the autonomous vehicle and/or an assertiveness score associated with the entity. At a high level, the intent score may indicate how clear (or not) the autonomous vehicle's intent to perform an action is to another entity—and the assertiveness score may indicate an extent to which either the autonomous vehicle or the entity would need to alter its behavior in response to the action (e.g., to avoid a collision). Note that an assertiveness core may be calculated for the autonomous vehicle and/or the entity. The autonomous vehicle may determine the intent score associated with the autonomous vehicle based at least in part on tracking previous actions of the autonomous vehicle and providing the previous actions as input to a prediction component as input.

The prediction component may normally be used to predict actions of entities that the autonomous vehicle detects but, according to the techniques discussed herein, the prediction component may receive the same or similar input associated with the autonomous vehicle as would have been used to predict information about other entities including, but not limited to, previous actions of the autonomous vehicle and output one or more predicted trajectories of the autonomous vehicles and probabilities associated therewith. The autonomous vehicle may use the one or more predicted trajectories and/or the probabilities to determine the intent score. For example, the intent score may decrease, indicating other entities may have more difficulty in perceiving the autonomous vehicle's intended future action(s), as the number of predicted trajectories associated with the autonomous vehicle increase. Conversely, the intent score may increase as the number of predicted trajectories decreases and/or as a single trajectory is increasingly associated with a high probability.

The autonomous vehicle may determine the assertiveness score based at least in part on determining a minimum discomfort metric (e.g., probability of change of headings, the minimum distance that the autonomous vehicle would come to another object in executing a maneuver), acceleration (e.g., longitudinally and/or laterally), and/or jerk (e.g., longitudinally and/or laterally) necessary for either the autonomous vehicle or the entity to perform a maneuver to avoid collision, or otherwise to safely operate, including for the autonomous vehicle to come to a stop. For example, determining the minimum acceleration and/or jerk may comprise determining, based at least in part on a track associated with the entity generated by the autonomous vehicle, one or more predicted trajectories associated with the entity, and selecting a predicted trajectory from among the one or more predicted trajectories that is a collision free trajectory and is associated with a minimum acceleration and/or jerk. The assertiveness score may be determined based at least in part on determining a maximum acceleration and/or jerk of that trajectory. In some examples, the techniques may additionally or alternatively comprise selecting a predicted trajectory associated with the autonomous vehicle from which to determine the assertiveness score, such as in a case where no predicted trajectory associated with the entity can feasibly stop before creating a collision. In various examples, the minimum discomfort metric may be based on, for examples, combinations of such accelerations and/or jerks. As a non-limiting example, the metric may penalize harsh braking, large lateral accelerations, unsmooth motion, and the like.

In some instances, determining the collaboration score and/or the negotiation score may comprise tracking the intent score associated with the autonomous vehicle and the assertiveness score associated with an entity over time and determining a change of the intent score and/or the assertiveness score associated with a time or time window. The autonomous vehicle may determine a line fit to the changes in intent scores and/or assertiveness scores over time where the collaboration score may be based at least in part on the slope or other coefficient of the line and the negotiation score may be based at least in part on a residual, such as a coefficient of determination (R-squared value), lack-of-fit sum of squares, reduced chi-squared, and/or the like.

In an additional or alternate example, the collaboration score and/or the negotiation score may be output by a machine-learned (ML) model or may be based on output from an ML model. For example, the ML model may be trained to receive an intent score and/or track associated with the autonomous vehicle and/or assertiveness score, track, sensor data, and/or perception data associated with the entity and output a collaboration score and/or negotiation score based thereon or a value that may be used as part of the determination of the collaboration score and/or negotiation score.

In some examples, the intent score, assertiveness score, collaboration score, and/or negotiation score may be provided to a planning component of the autonomous vehicle. The planning component of the autonomous vehicle may use the intent score, assertiveness score, collaboration score, and/or negotiation score to select a trajectory for controlling the autonomous vehicle. For example, the planning component may select the trajectory based at least in part on determining a plurality of trajectories and costs. In some examples, the collaboration score and/or negotiation score may be used by the planning component as part of the cost determination associated with a trajectory. For example, the planning component may scale the cost associated with a trajectory based at least in part on the collaboration score and/or negotiation score. In additional or alternate examples, the collaboration score and/or negotiation score may be used to alter thresholds for trajectory selection, the intent score, or the assertiveness score.

The planning component may select a trajectory, from among the plurality of trajectories, that is associated with a trajectory that reduces the costs and/or increases the collaboration score and/or negotiation score. In other words, a trajectory may be selected based at least in part on the trajectory having a cost associated therewith that is a minimum among the other costs or that is below a threshold. The planning component may determine a negotiation score and/or collaboration score associated with the trajectory and may select a different trajectory if the negotiation score and/or collaboration score fails to meet a threshold or may implement the trajectory if the negotiation score and/or collaboration score meet or exceeds the threshold.

The assertiveness score and/or intent score may additionally or alternatively be used as part of this check. Practically, this check ensures that the selected trajectory accords with what the entity was expecting the autonomous vehicle to do, whether the autonomous vehicle can trust the intent score and/or assertiveness score in selecting the trajectory, or the like. For example, selecting the trajectory may include selecting a trajectory based on its cost, determining an intent score and/or assertiveness score associated with the trajectory (for the autonomous vehicle and/or the entity), and determining whether the assertiveness score associated with the trajectory is less than an assertiveness score threshold (e.g., indicating that the autonomous vehicle isn't expecting or forcing the entity to slow down an unreasonable amount), whether the intent score meets or exceeds an intent score threshold (e.g., the autonomous vehicle's intent has been sufficiently communicated to be clear to other entities), and/or that the trajectory satisfies one or more safety tolerances.

In some examples, the assertiveness score threshold, the intent score threshold, and/or safety tolerances may be a function of the negotiation score and/or collaboration score. In other words, if the negotiation score and/or the collaboration score do not meet a threshold, then the assertiveness score threshold may be decreased, the intent score threshold may be increased, and/or safety tolerances may be maintained or increased. This may have the effect of causing more conservative trajectories to be selected. In an alternative example where the negotiation score and/or the collaboration score meet or exceed the threshold, the assertiveness score threshold may be increased, the intent score threshold may be decreased, and/or safety tolerances may be maintained or decreased (at least down to a bottom bound), which may have the effect of selecting more aggressive trajectories. In another example, instead of altering one of the thresholds, the negotiation score and/or collaboration score may be used to boost or cut the intent score and/or assertiveness score to a similar effect. In an additional or alternate example, the assertiveness score may be reduced based at least in part on an increase in the intent score in other words, the more clearly the autonomous vehicle conveys its intent, the more the autonomous vehicle may expect other entities to yield in some cases.

In some examples, the planning component may use the negotiation score to determine an extent to which the autonomous vehicle's actions are being relied upon by an entity (e.g., colloquially, how strongly the autonomous vehicle and the entity are communicating with their actions) and, if the negotiation score meets or exceeds a threshold, the planning component may use the collaboration score to reduce gains and/or safety tolerances associated with a collision avoidance component in situations that may have previously been difficult or impossible for the autonomous vehicle to act as a human would expect, such as passing a double-parked vehicle into oncoming traffic. The safety tolerances may comprise a lower bound that may not be further reduced by the planning component. For example, the lower bound may be a time period or distance from a nearest object.

In some instances, determining the negotiation score and/or collaboration score may be based at least in part on an object type associated with an entity, an indication of an orientation of the entity, and/or an indication of whether or not the entity is paying attention. For example, an indication that the entity is a pedestrian and an indication that the pedestrian is not paying attention (e.g., looking at their phone) may be used to decrease the negotiation score and/or collaboration score. For example, see U.S. patent application Ser. No. 16/457,524, filed Jun. 28, 2019; U.S. patent application Ser. No. 16/726,042, filed Dec. 23, 2019; and/or U.S. patent application Ser. No. 16/363,541, filed Mar. 26, 2019, the entirety of which are incorporated herein. Decreasing the negotiation score and/or collaboration score may have the effect of causing trajectories associated with a high assertiveness score and/or a low intent score, negotiation score, and/or collaboration score to be rejected by the planning component, or otherwise downweighted in favor of other trajectories. For example, the decrease in the negotiation score and/or collaboration score may cause threshold(s) to be altered and/or costs and/or scores to be scaled, as discussed further herein. In an additional or alternate example, the indications (e.g., object type, object orientation, object attention signal) may be used to modify thresholds associated with the intent score, assertiveness score, negotiation score, and/or collaboration score for selecting a trajectory. In situations where at least one of the scores does not meet one of the thresholds discussed herein, the autonomous vehicle may select a different trajectory and/or reduce speed or otherwise take a more conservative approach to determining the trajectory for controlling the autonomous vehicle.

In some examples, additional or alternate thresholds may be modified based on the negotiation score and/or collaboration score, such as a comfortability threshold, such as maximum allowable jerk, or the like. For example, if the collaboration score meets or exceeds a threshold, the maximum jerk may be increased.

In an additional or alternate example, the intent score, the assertiveness score, negotiation score, and/or collaboration score may be used to determine the intensity of a scenario or a region and modifying gains and/or tolerances associated with operation of the autonomous vehicle based at least in part on the intensity. For example, the negotiation score and/or collaboration score may be more positive for a suburban neighborhood than for a busy city center known for aggressive driving, where the negotiation score and/or collaboration score may be lower and/or negative. Additionally or alternatively, determining the intensity may be based at least in part on a frequency with which the assertiveness score is positive and/or meets or exceeds a threshold (e.g., regularly forcing other entities to yield) or is negative and/or fails to meet a threshold (e.g., regularly being forced to yield).

In some examples, the techniques may comprise adjusting an operating configuration of the autonomous vehicle based at least in part on the intensity. One or more autonomous vehicles may report negotiation scores and/or collaboration scorees and one of the autonomous vehicles and/or a remote computing device may determine an average negotiation score, collaboration score, and/or covariance associated therewith and associated with a geographical region, time of day, day of week, etc. based on the negotiation scores and/or collaboration scores. This data may be amalgamated as a data structure, which may be transmitted to one or more autonomous vehicles. An autonomous vehicle may alter an operating configuration of the autonomous vehicle based at least in part on the data structure. For example, altering the operating configuration may comprise modifying safety tolerances (e.g., reduce the spatial or time gap permitted by a collision avoidance system), altering thresholds (e.g., increase the assertiveness score threshold, decrease the negotiation score and/or collaboration score threshold, increase the maximum jerk associated with a trajectory), and/or modifying scalars by which a cost associated with a trajectory is multiplied. In some examples, to determine a current operating configuration, the autonomous vehicle may determine a current time, determine a location of the autonomous vehicle (e.g., based at least in part on a global positioning system (GPS) signal or other sensor data), determine an average negotiation score and/or collaboration score for a current scenario, and/or interpolate between intensity values and operating configurations in the data structure.

In an additional or alternate example, the negotiation score and/or collaboration score may be used to determine a quality of operation of the planning component. For example, the negotiation score and/or collaboration score may be used as at least part of a metric for scoring operation of the planning component for quality and safety. This metric may be used to determine a baseline associated with the planning component, determine whether an update to the planning component improves the planning component, label data for semi- or fully unsupervised training, or the like.

The techniques may improve the safety and efficiency of an autonomous vehicle. For example, the techniques may cause the autonomous vehicle to operate more "naturally" as compared to what a human would expect, which may make the autonomous vehicle's operations safer since human drivers wouldn't be surprised by the autonomous vehicle behavior. The techniques may also reduce the amount of time to complete a mission (e.g., delivering a passenger, delivering a package), reduce traffic, and reduce wear and tear on the autonomous vehicle. The techniques may also increase the number of scenarios the autonomous vehicle is capable of handling without calling teleoperations and/or without taking an overly conservative action that may increase traffic, risk a collision, increase mission time, and/or increase other motorists' angst.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a localization component 110, a perception component 112, a planning component 114, and/or a negotiation component 116. In general, localization component 110 may comprise software and/or hardware system(s) for determining a pose (e.g., position and/or orientation) of the vehicle 102 relative to one or more coordinate frames (e.g., relative to the environment, relative to a roadway, relative to an inertial direction of movement associated with the autonomous vehicle). The localization component 110 may output at least part of this data to the perception component 112, which may output at least some of the localization data and/or use the localization data as a reference for determining at least some of the perception data.

The perception component 112 may determine what is in the environment surrounding the vehicle 102 and the planning component 114 may determine how to operate the vehicle 102 according to information received from the localization component 110 and/or the perception component 112. The localization component 110, the perception component 112, the planning component 114, and/or the negotiation component 116 may include one or more machine-learned (ML) models and/or other computer-executable instructions.

In some examples, the localization component 110 and/or the perception component 112 may receive sensor data from the sensor(s) 104 and may provide one or more outputs to the negotiation component 116. In some instances, the perception component 112 may determine data related to objects in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the objects surrounding the vehicle 102 may be simulated objects of a simulated environment. The data produced by the perception component 112 may be collectively referred to as "perception data." Once the perception component 112 has generated perception data, the perception component 112 may provide the perception data to the planning component 114.

In some examples, the perception component 112 may store historical sensor data and/or perception data associated with an entity as a track (e.g., an object classification and historical position, heading, speed, velocity, acceleration, jerk or the like). According to the techniques discussed herein, the perception component 112 may store a track associated with any objects that the vehicle 102 detects and/or for the vehicle 102 itself. In the example scenario 100, for example, the perception component 112 may generate and store a track 118 associated with vehicle 120 that the vehicle 102 has detected and a track 122 associated with the vehicle 102. The track 122 associated with the vehicle 102 may be based on externally available actions (actions that another entity could observe) and/or internally available data (data the vehicle 102 generates self-referentially). In at least one example, the track 122 comprises data determined based at least in part on externally available actions.

In some examples, the perception component 112 may comprise a prediction component that determines one or more predicted trajectories associated with an object based at least in part on sensor data and/or other perception data associated with the object, such as a track associated with the object. For example, in the depicted scenario 100, the vehicle 102 may detect the presence of an entity, vehicle 120, based at least in part on the sensor data generated by sensor(s) 104. The perception component 112 may determine one or more predicted trajectories (e.g., predicted trajectory 124 and predicted trajectory 126) based at least in part on the track 118 associated with the object and/or other situational data generated by the vehicle 102 (e.g., environment data indicating visibility, roadway location and shape, signage and/or signal locations and/or states, tracks associated with other objects). For example, see U.S. patent application Ser. No. 16/297,381, filed Mar. 8, 2019; U.S. patent application Ser. No. 16/872,284, filed May 11, 2020; and/or U.S. patent application Ser. No. 16/866,865, filed May 5, 2020. In some examples, the perception component 112 may determine a probability 128 associated with a predicted trajectory. For the sake of space, FIG. 1 only illustrates a probability 128 associated with predicted trajectory 126 but doesn't depict a probability associated with predicted trajectory 124, although a probability (e.g., a posterior probability, a covariance) may be calculated in association therewith. Predicting trajectories is discussed in more detail in U.S. patent application Ser. No. 16/866,839, filed May 5, 2020 and entitled "Object Velocity Detection from Multi-Modal Sensor Data," and top-down prediction associated with the environment is described in more detail in U.S. patent application Ser. No. 16/779,576.

The techniques discussed herein may comprise determining an assertiveness score, which may be based at least in part on the predicted trajectories associated with an object, such as predicted trajectory 124 and/or predicted trajectory 126 associated with vehicle 120.

According to the techniques discussed herein, in some examples, the negotiation component 116 may cause the perception component 112 to process track 122 associated with the vehicle 102, as if the vehicle 102 were another vehicle, as part of the process for determining an intent score associated with the vehicle 102. For example, perception component 112 may predict trajectories 130 and/or 132 in association with vehicle 102 based at least in part on the track 122 associated with vehicle 102. The perception component 112 may determine a probability 134 associated with any of these predicted trajectories. Note that, for the sake of clarity, the number of depicted predicted trajectories associated with vehicle 102 and vehicle 120 are limited when, in practice, the number of predicted trajectories may be one or more (e.g., 1, 5, 10, 100, 1,000). In some examples, the predicted trajectories used by the techniques discussed herein may be limited to those trajectories associated with probabilities that meet or exceed a threshold probability.

The negotiation component 116 may comprise software and/or hardware and may execute the operations discussed herein related to determining the intent score, assertiveness score, negotiation score, and/or collaboration score, collectively or singularly the "negotiation data." In some examples, the negotiation component 116 may cause the prediction component of the perception component 112 and/or the planning component 114 to accomplish at least some of the actions discussed herein, receive output from the perception component 112 and/or the planning component 114, and/or provide input from one of the components to the other.

The planning component 114 may determine a trajectory (e.g., planned trajectory 136) for controlling the vehicle 102 based at least in part on the perception data, which may comprise the negotiation data, and/or other information such as, for example, localization data (e.g., where the vehicle 102 is in the environment relative to a map and/or features detected by the perception component 112). For example, the planning component 114 may determine a route for the vehicle 102 from a first location to a second location; generate, substantially simultaneously and based at least in part on the perception data and/or the simulated perception data, a plurality of potential trajectories for controlling motion of the vehicle 102 in accordance with a receding horizon technique (e.g., 1 micro-second, half a second, 8 seconds, and the like) to control the vehicle to traverse the route (e.g., in order to avoid any of the detected objects); and select one of the potential trajectories as a trajectory that the vehicle 102 may use to generate a drive control signal that may be transmitted to drive components of the vehicle 102. The heading may represent a heading, velocity, and/or acceleration, although the trajectory itself may comprise instructions for a PID controller, which may, in turn, actuate a drive system of the vehicle 102. For example, the trajectory may comprise instructions for controller(s) of the autonomous vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated). In some examples, the trajectory may comprise a target heading, target steering angle, target steering rate, target position, target velocity, and/or target acceleration for the controller(s) to track. Note that this planned trajectory may be different than the predicted trajectories, although in some instances, the planned trajectory 136 may match at least one of the predicted trajectories.

In some examples, the planning component 114 may determine a cost associated with a trajectory generated by the planner. For example, see U.S. patent application Ser. No. 16/517,506, filed Jul. 19, 2019. In some examples, the cost may be scaled based at least in part on the negotiation data, as discussed in more detail herein, and/or an intent score and/or assertiveness score may be determined in association with the trajectory. In some examples, the negotiation score and/or collaboration score may be used by the planning component 114 to alter threshold(s) for selecting a trajectory. For example, a trajectory may be selected based at least in part on a cost calculated according to U.S. patent application Ser. No. 16/872,284, filed May 11, 2020, and a negotiation check may be conducted afterwards. The negotiation check may comprise determining an intent score associated with the vehicle 102 and an assertiveness score associated with the vehicle 120, altering an intent score threshold and/or an assertiveness score threshold based at least in part on a negotiation score and/or collaboration score generated based at least in part on the scenario, and either re-selecting a new trajectory if the intent score and/or assertiveness score do not satisfy the altered thresholds or confirming selection of the trajectory if the intent score and assertiveness score satisfied the altered thresholds.

Example System

Figure 2:
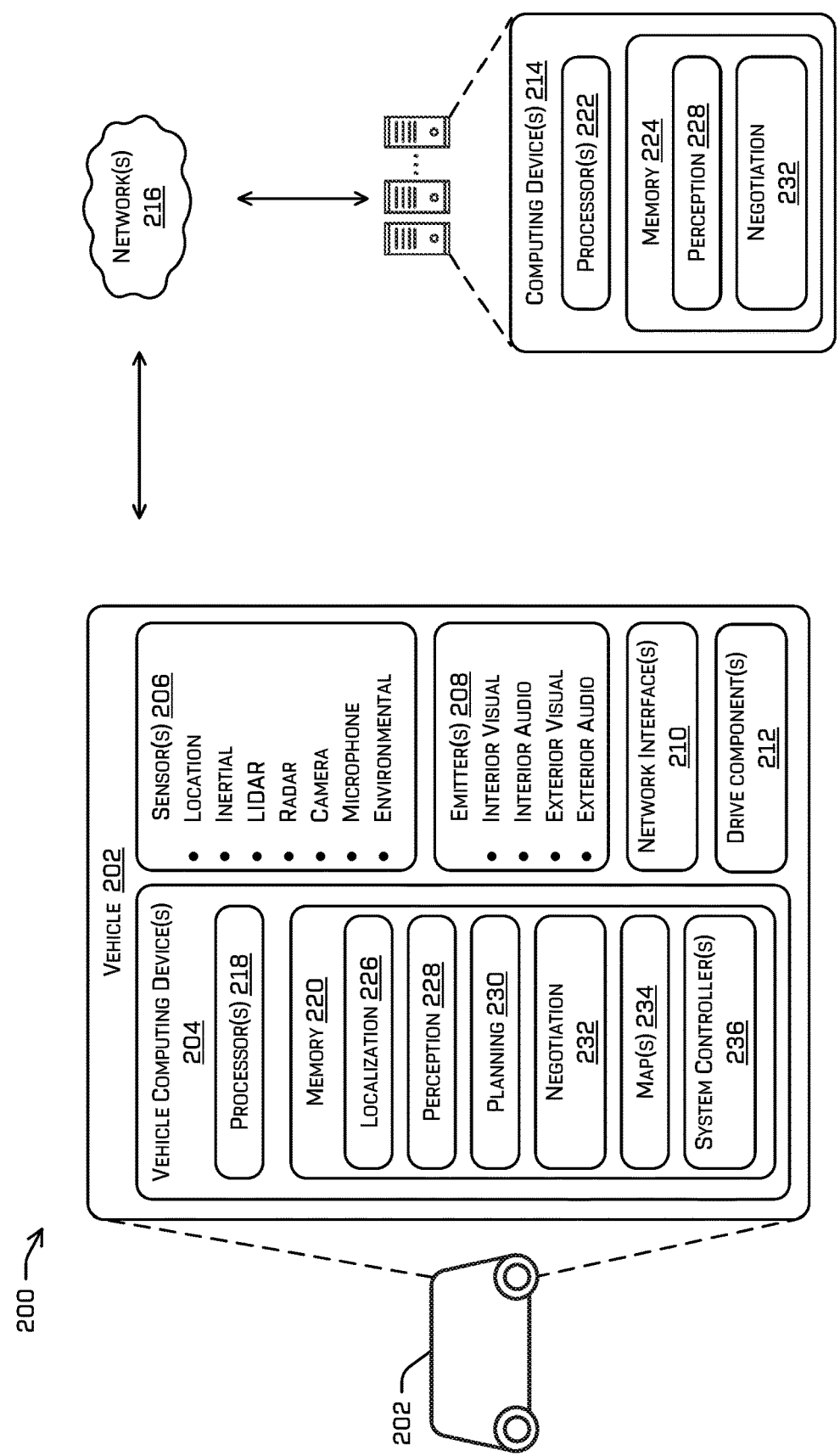
FIG. 2 illustrates a block diagram of an example architecture for an autonomous vehicle negotiation system.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (EUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. In some examples, the simulated sensors discussed herein may correspond to a specific type of sensor and/or any of the sensors. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, negotiation component 232, map(s) 234, and/or system controller(s) 236 zero or more portions of any of which may be hardware, such as GPU(s), CPU(s), and/or other processing units. Localization component 226 may represent localization component 110, perception component 228 may represent perception component 112, planning component 230 may represent planning component 114, and negotiation component 232 may represent negotiation component 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s)

234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. The planning component 230 may be part of the simulation system 238 in some examples.

The negotiation component 232 may receive sensor data and/or perception data and may cause the intent score, assertiveness score, negotiation score, and/or collaboration score to be determined (e.g., by the perception component 228 and/or the planning component 230). The negotiation component may, additionally or alternatively, alter threshold(s) and/or safety tolerances used by the planning component 230 to select a trajectory for controlling the vehicle 202 and/or by a collision avoidance system that may perform a check on the trajectory selected by the planning component 230. Additional details of the negotiation component 232 are described in detail herein.

The memory 220 and/or 224 may additionally or alternatively store a mapping system, a planning system, a ride management system, etc. Although perception component 228 and/or planning component 230 are illustrated as being stored in memory 220 and/or 224, perception component 228 and/or planning component 230 may include processor-executable instructions, machine-learned model(s) (e.g., a neural network), and/or hardware.

As described herein, the localization component 226, the perception component 228, the planning component 230, negotiation component 232, and/or other components of the system 200 may comprise one or more ML models. For example, the localization component 226, the perception component 228, the planning component 230, and/or the negotiation component 232 may comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228 and/or negotiation data, threshold(s) and/or threshold/tolerance modification(s) generated by the negotiation component 232 and transmit the instructions to the system controller(s) 236, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process

Figure 3:
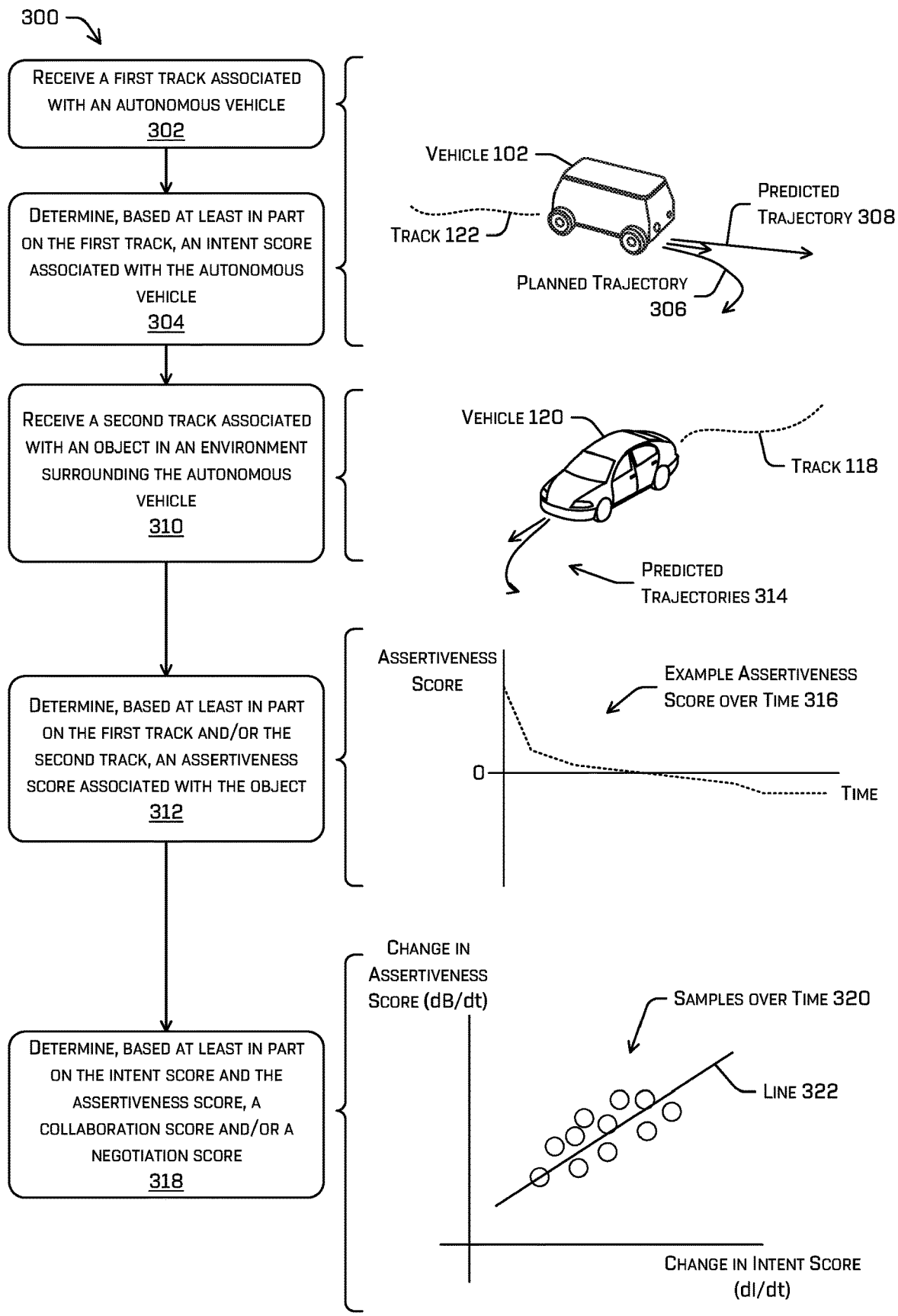
FIGS. 3-5 illustrate a pictorial flow diagram of example process(es) controlling an autonomous vehicle based at least in part on a negotiation score and/or collaboration score.
Figure 4:
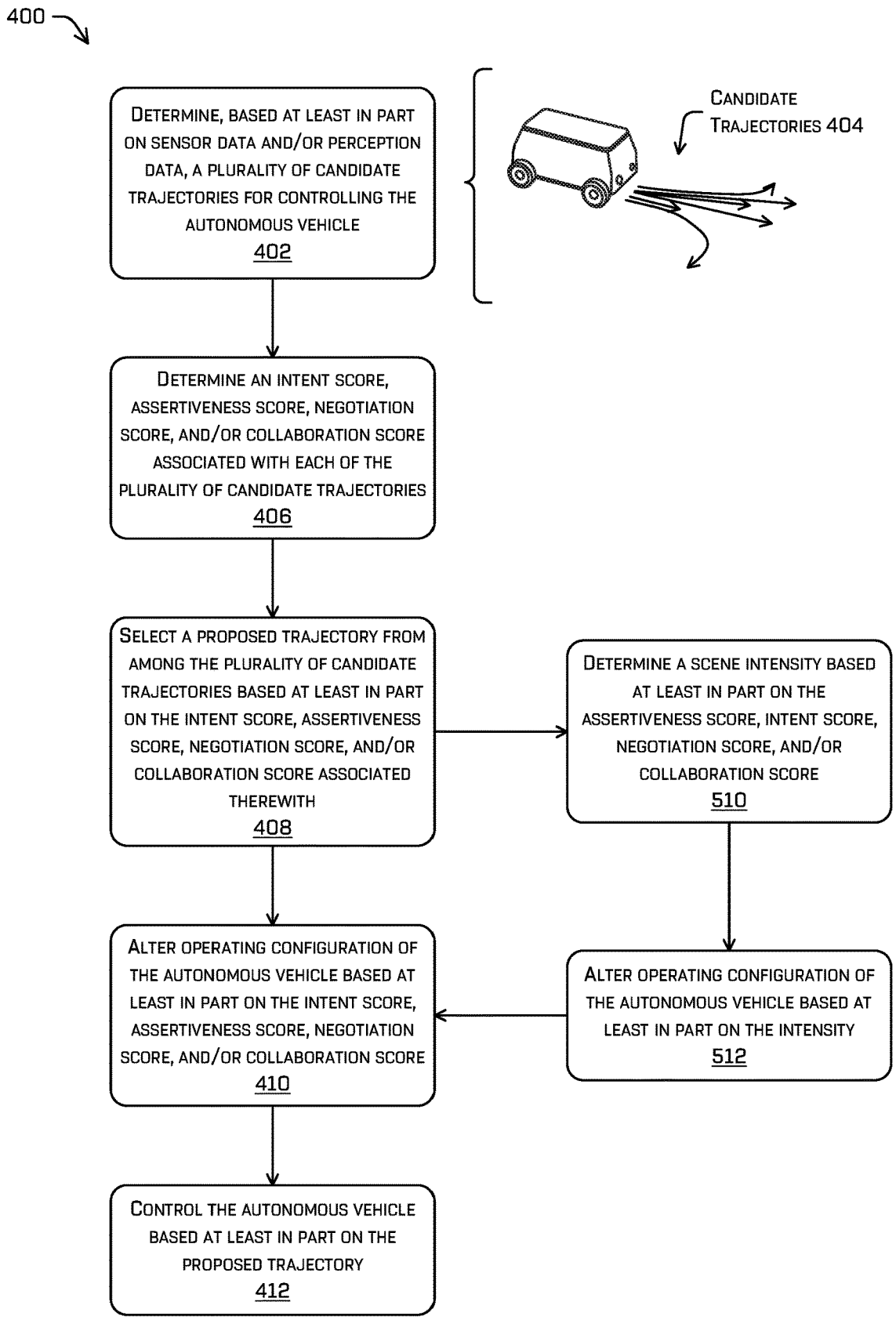
Figure 5:
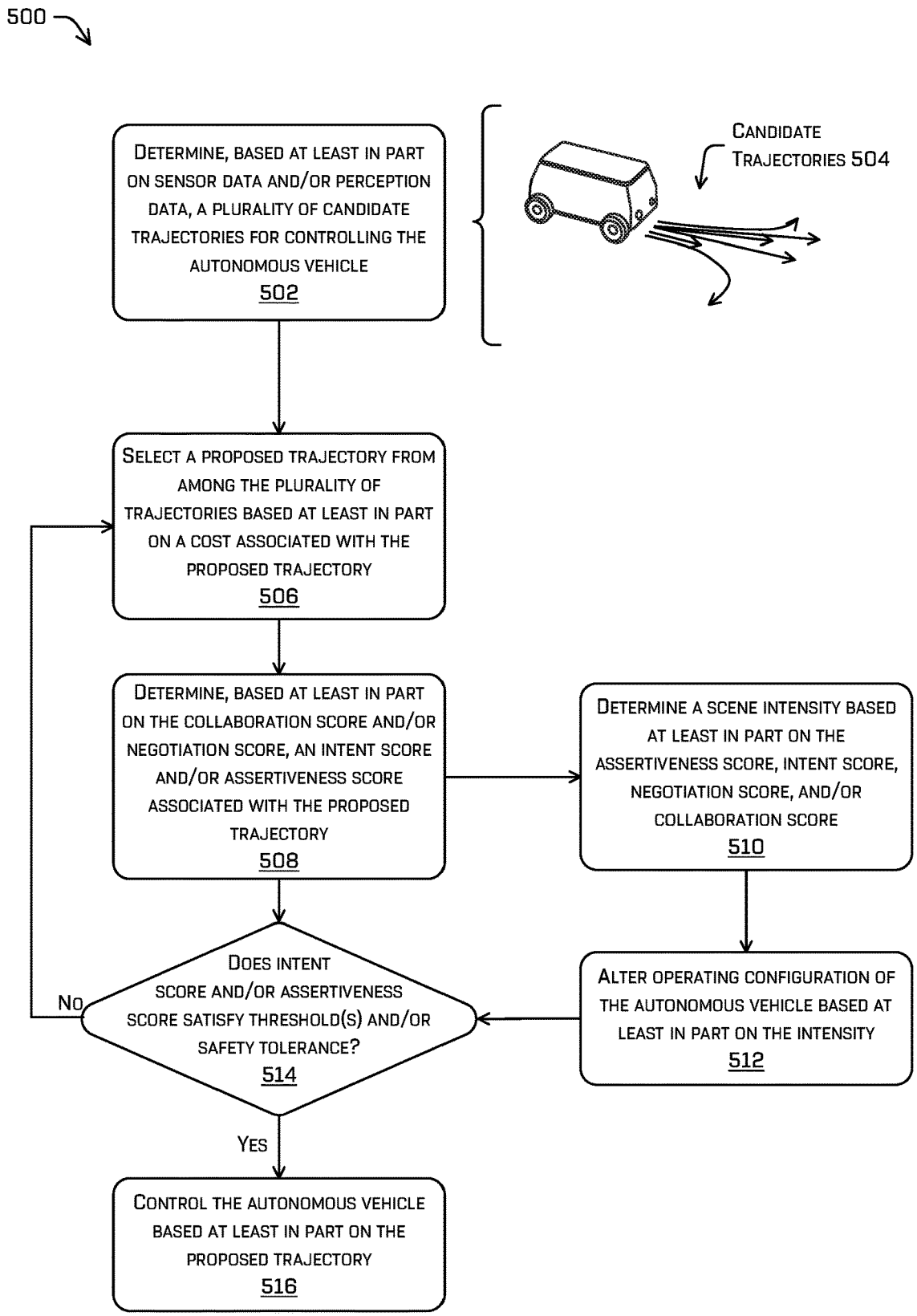

FIGS. 3-5 illustrate pictorial flow diagrams of example processes 300, 400, and/or 500 for controlling an autonomous vehicle using the negotiation perception techniques discussed herein. Example process(es) 300, 400, and/or 500 may be implemented any time the vehicle 102 detects, based at least in part on sensor data, an entity in an environment associated with the vehicle 102 (e.g., the vehicle 102 may be traversing the environment).

At operation 302, example process 300 may comprise receiving a first track associated with an autonomous vehicle, according to any of the techniques discussed herein. For example, the first track may comprise a record of the position, heading, speed, velocity, position in the roadway (e.g., relative to a lane marker or roadway feature such as a junction or exit), and/or states associated with the vehicle over a previous time window. The states may comprise various externally consumable signals, such as a turn signal indicator, a parking light indicator, a hazard light indicator, audio, and/or the like. FIG. 3A depicts the first track, track 122, as a series of previous locations, although it is understood that the track may comprise additional or alternate data, as discussed herein.

At operation 304, example process 300 may comprise determining, based at least in part on the first track, an intent score associated with the autonomous vehicle, according to any of the techniques discussed herein. An intent score may comprise an indicator of how clearly the vehicle 102 is communicating the action(s) the vehicle 102 will take in the near future (e.g., over a time horizon). In some examples, the intent score may be additionally or alternatively based at least in part on a planned trajectory, which may be a trajectory determined by a planning component of the autonomous vehicle based at least in part on sensor data, prediction data, negotiation data, environment data (e.g., map data), and/or the like. For example, determining the intent score may comprise determining the intent score associated with a particular action, such as planned trajectory 306 generated by the planning component. In additional or alternate examples, the intent score may be additionally or alternatively based at least in part on sensor data, other perception data, map data, or the like.

The planning component may generate one or more candidate trajectories based at least in part on sensor data and/or perception data, each of which may be associated with a cost in some examples. The planning component may select at least one of the candidate trajectories as a proposed trajectory and the negotiation component may determine an intent score associated with the proposed (planned) trajectory. In an additional or alternate example, an intent score may be determined for n number of proposed trajectories, where n is a positive integer and the n proposed trajectories may be the n lowest cost trajectories.

Determining the intent score associated with a proposed trajectory may comprise determining one or more predicted trajectories 308 and/or probabilities associated therewith using the perception component based at least in part on the first track, the planned trajectory 306, sensor data, other perception data, and/or map data. The predicted trajectories 308 may differ from the candidate trajectories and a proposed trajectory generated by the planning component since the predicted trajectories 306 may be a prediction of the vehicle 102's behavior by the perception component based on previous behavior exhibited by the vehicle 102, as if the vehicle 102 were an object detected by the perception component. Whereas the candidate trajectories and proposed trajectory may be generated by the planning component for controlling actions of the vehicle 102 and may be based on any of the data available to the vehicle 102, not just externally identifiable behavior.

The intent score may be based at least in part on a probability associated with a predicted trajectory determined by the perception component. For example, the intent score for a particular predicted or planned trajectory (e.g., continuing to go straight through an intersection, stopping before the intersection, making a right turn), the m-th predicted trajectory, may comprise a marginal value computed as follows:

$$I(\hat{t}_m) = \frac{P(\hat{t}_m)}{\sum_{j=0}^{p} P(\hat{t}_j)} \qquad (1)$$

where $P(\hat{t}_p)$ is the probability associated with the p-th predicted trajectory. Note that, as the number of predicted trajectories increases, the intent score may decrease. In some examples, the prediction component may output predicted trajectories associated with probabilities meeting or exceeding a lower threshold. The probability may be a likelihood or covariance in some examples. In practice, as the number of predicted trajectories increases (e.g., due to the autonomous vehicle changing velocity, orientation, and/or states repeatedly, such as by turning on a turn signal indicator then turning it off), the intent score may decrease, which may indicate that other entities may be less sure of what the autonomous vehicle will do next/less sure that the autonomous vehicle will execute a particular action.

At operation 310, example process 300 may comprise receiving a second track associated with an object in an environment surrounding the autonomous vehicle, according to any of the techniques discussed herein. For example, the second track may comprise historical and/or current sensor data and/or perception data associated with the object, such as the object classification, various states (e.g., turn signal indicators, headlight state), position, velocity, heading, etc. Note that, although FIGS. 1 and 3 depicts a vehicle as the entity that the autonomous vehicle encounters, the entity could be any dynamic object. In some examples, the second track may be determined by a prediction component based at least in part on sensor data, perception data, environment data (e.g., map data), and/or the like.

At operation 312, example process 300 may comprise determining based at least in part on the second track and/or the first track, an assertiveness score associated with the object, according to any of the techniques discussed herein. The assertiveness score may comprise an indication of the extent to which the entity must change its behavior/current state in order to prevent a collision with the autonomous vehicle. Additionally or alternatively, the assertiveness score may indicate an extent to which the autonomous vehicle must change its behavior to avoid a collision. FIGS. 4 and 5 provide graphs of assertiveness scores over time for different scenarios. In some examples, a first assertiveness score may be associated with the vehicle 102 and/or a second assertiveness score may be associated with the entity encountered by the vehicle 102.

In some examples, determining the assertiveness score associated with an entity may comprise determining the minimum acceleration, jerk, and/or other discomfort metric necessary for the entity to come to a stop before hitting the autonomous vehicle based at least in part on predicted trajectories 314 output by the prediction component in association with the entity. In some examples, determining the assertiveness score may be based at least in part on a current position and/or trajectory being implemented by the autonomous vehicle (e.g., which may comprise an indication of a future position of the autonomous vehicle) and/or based on a predicted trajectory associated with the autonomous vehicle. In some examples, the assertiveness score and/or the intent score may be repeatedly determined overtime and tracked. For example, FIG. 3A depicts an example assertiveness score over time 316 that indicates a positive assertiveness score associated with the vehicle 120 linearly becoming a negative assertiveness score over time. This may indicate that the entity is giving way to the autonomous vehicle in an example where a positive assertiveness score indicates that the entity is expecting the autonomous vehicle to yield the right of way and a negative assertiveness score indicates that the entity may be decelerating. For example, the example assertiveness score over time 316 may indicate that the jerk associated with the minimum acceleration required to avoid a collision transitions from being high to being negative, indicating that the entity may be decelerating. An assertiveness score of zero may indicate that no collision will result if the state of the scenario stays the same.

In some instance, determining the assertiveness score may be based at least in part on selecting one of the predicted trajectories 314 associated with the entity based at least in part on determining that the predicted trajectory is collision-free and is associated with a minimum average jerk as compared to any other collision-free predicted trajectories. The assertiveness score may be based at least in part on the maximum jerk of the predicted trajectory that is selected. In some examples, the assertiveness score may be normalized based at least in part on a reference maximum and/or minimum from a physical model, previous recorded data, and/or heuristics.

At operation 318, example process 300 may comprise determining, based at least in part on the intent score and/or the assertiveness score, a collaboration score and/or a negotiation score, according to any of the techniques discussed herein. Determining the collaboration score and/or the negotiation score may comprise sampling and/or storing the intent score associated with the autonomous vehicle and/or the assertiveness score associated with the entity over time and determining a change in the negotiation score and/or assertiveness score over time. In some examples, the negotiation component may log changes in the negotiation score and/or assertiveness score associated with different time periods over time as samples 320. For example, FIG. 3A depicts a graph that plots the change in assertiveness score on the y-axis and the change in negotiation score on the x-axis where each circle represents the change in assertiveness score and the change in negotiation score associated with a time period.

Upon collection of a sufficient amount of data (e.g., samples of the change in assertiveness score and change in negotiation score for multiple time periods over a time window), the negotiation component may determine the collaboration score and/or the negotiation score based at least in part on the samples. In at least one example, determining the collaboration score and/or the negotiation score may comprise fitting a line and/or curve to the samples (e.g., line 3422 depicted in FIG. 3A). Determining the collaboration score may be based at least in part on the slope or other coefficient of the line and the negotiation score may be based at least in part on a residual, such as a coefficient of determination (R-squared value), lack-of-fit sum of squares, reduced chi-squared, and/or another statistical dispersion (e.g., standard deviation, mean absolute difference).

In the depicted example, a positive change in assertiveness score may indicate that the entity is taking adversary action(s) and is less likely to yield the right of way to the autonomous vehicle, and a negative change in assertiveness score indicates that the entity is likely yielding the right of way to the autonomous vehicle. The negotiation score may indicate an extent to which the changes in assertiveness score are responsive to actions of the autonomous vehicle, when the negotiation score is at or above a negotiation score threshold, or the extent to which the entity's actions are independent of the autonomous vehicle's actions for a negotiation score that does not meet the negotiation score threshold (e.g., a low R-squared value). The collaboration score may indicate how collaborative the entity is, e.g., how willing the entity is to work with the autonomous vehicle. In some examples, metrics regarding the fit (e.g., the R-squared value, the negotiation score, lack-of-fit sum of squares) may be used to modify (e.g., scale) the change in assertiveness score, the assertiveness score, and/or the intention score and/or thresholds associated therewith that may be used in the trajectory selection process.

FIGS. 4 and 5 depict flow diagrams of example process 400 and example process 500, which may be used in combination or alternately. In some examples, the vehicle 102 may determine to select example process 400 based at least in part on detecting a first condition and/or select example process 500 based at least in part on detecting a second condition. Additionally or alternatively, the vehicle 102 may be configured to carry out example process 400 and/or example process 500. At a high level, example process 400 may be executed by the vehicle 102 in an example where the vehicle 102 is configured to determine a planned trajectory using the negotiation data whereas example process 500 may be executed by the vehicle 102 in an example where the planned trajectory is determined by the planning component with or without the negotiation data and the negotiation data is used to modify the planned trajectory. It is understood that these processes may be combined. For example, at least part of example process 400 may be used to determine a proposed trajectory based at least in part on negotiation data and at least part of example process 500 may be used to modify that proposed trajectory based at least in part on the negotiation data.

Turning to FIG. 4, at operation 402, example process 400 may comprise determining, based at least in part on the sensor data and/or perception data, a plurality of candidate trajectories for controlling the autonomous vehicle, according to any of the techniques discussed herein. In some examples, operation 322 may comprise determining a cost associated with a candidate trajectory, as discussed further in U.S. patent application Ser. No. 16/872,284, filed May 11, 2020. In some examples, the cost may comprise or be based at least in part on the intention score, assertiveness score, negotiation score, and/or collaboration score. For example, FIG. 4 depicts a plurality of candidate trajectories 404, each of which may be associated with different costs in at least one example.

At operation 406, example process 400 may comprise determining an intent score, assertiveness score, and/or collaboration score associated with each of the plurality of candidate trajectories, according to any of the techniques discussed herein. For example, operation 406 may comprise all or part of example process 300. In at least one example, at least one intent score, assertiveness score, negotiation score, and/or collaboration score may be determined in association with at least one of the plurality of candidate trajectories.

At operation 408, example process 400 may comprise selecting a proposed trajectory from among the plurality of candidate trajectories based at least in part on the intent score, assertiveness score, negotiation score, and/or collaboration score associated with the proposed trajectory, according to any of the techniques discussed herein. For example, operation 408 may comprise selecting, as the proposed trajectory, a candidate trajectory that is associated with an intent score that meets or exceeds a threshold (e.g., the intent score indicates that other entities anticipate that trajectory), does not meet a threshold assertiveness threshold (e.g., the trajectory doesn't force another entity to take a drastic action), etc.

Note that example process 400 may additionally or alternatively comprise operation(s) 510 and/or 512, as discussed in more detail below. In some examples, an intent score threshold and/or assertiveness threshold may be set based at least in part on a negotiation score, collaboration score, intensity score, location, day of the week, time of day, other perception data, and/or the like. For example, as the negotiation score and/or collaboration score increase, the assertiveness threshold may be altered to allow the vehicle 102 to be more assertive (e.g., allowing the vehicle 102 to select a trajectory that has a higher assertiveness score associated with the vehicle 102 than would have been allowed and/or with a lower assertiveness score associated with the entity than would have been allowed, since assertiveness scores may be associated with the vehicle and/or the entity). Similarly, as the negotiation score and/or collaboration score increase, the intent score threshold may be reduced since the negotiation score, in particular, may indicate that the entity is paying attention to the vehicle 102 and/or that the entity is changing its behavior based on the actions of the vehicle 102.

In some examples, at operation 410, example process 400 may comprise altering an operating configuration of the autonomous vehicle based at least in part on the intent score, assertiveness score, negotiation score, and/or collaboration score, according to any of the techniques discussed herein. For example, operation 410 may comprise altering tolerances associated with a collision check component that may operate to verify the proposed trajectory. In some examples, the collision check component may reject the proposed trajectory or may verify the proposed trajectory, causing the proposed trajectory to be implemented as the planned trajectory, which may be used to control the autonomous vehicle at operation 412. Altering tolerances associated with the collision check component may comprise shrinking the size of a polygon or other shape denoting the space occupied by an entity in the environment (e.g., the collision check component may normally dilate the size of this shape and altering the size may comprise dilating the size less or not dilating the size at all), altering acceleration assumptions about other entities in the environment, altering a proximity tolerance (e.g., how close the vehicle 102 may get to other entities), and/or the like. Additionally or alternatively, if there is a low intent score and/or a high assertiveness score, operation 410 may comprise increasing tolerances (e.g., increasing a minimum distance, increasing a minimum time or distance to stop, decreasing gains associated with positive acceleration of the drive system).

At operation 412, example process 400 may comprise controlling the autonomous vehicle based at least in part on the proposed trajectory, according to any of the techniques discussed herein. In some examples, operation 412 may only be accomplished if the proposed trajectory passes a collision check. Regardless, upon implementation, the proposed trajectory is implemented as the planned trajectory.

Turning to FIG. 5, at operation 502, example process 500 may comprise determining, based at least in part on the sensor data and/or perception data, a plurality of candidate trajectories for controlling the autonomous vehicle, according to any of the techniques discussed herein. In some examples, operation 322 may comprise determining a cost associated with a candidate trajectory, as discussed further in U.S. patent application Ser. No. 16/872,284, filed May 11, 2020. In some examples, the cost may comprise or be based at least in part on the intention score, assertiveness score, negotiation score, and/or collaboration score. For example, FIG. 3B depicts a plurality of candidate trajectories 50, each of which may be associated with different costs in at least one example.

At operation 506, example process 500 may comprise selecting a proposed trajectory from among the plurality of trajectories based at least in part on the cost associated with the proposed trajectory, according to any of the techniques discussed herein. In some examples, when there are two candidates having a same or similar cost (e.g., within a threshold amount), the autonomous vehicle may select the candidate trajectory that is associated with a higher intent score. For example, if the autonomous vehicle briefly turned on a turn indicator but later turned it off and continued straight, if the intent score is higher for completing the turn than continuing straight, operations 326 and/or 328 may result in selecting the trajectory associated with completing the turn since the intent score associated therewith may be higher than the intent score associated with continuing straight.

At operation 508, example process 500 may comprise determining, based at least in part on the collaboration score and/or the negotiation score, an intent score and/or assertiveness score associated with the proposed trajectory, according to any of the techniques discussed herein. In some examples, operation 328 may additionally or alternatively comprise altering the intent score, assertiveness score, intent score threshold, and/or assertiveness score threshold based at least in part on the collaboration score, the negotiation score, and/or the track associated with the entity. For example, if the collaboration score is negative the assertiveness score threshold may be lowered, for certain types of object classifications (e.g., pedestrians, cyclists, children) the intent score threshold may be increased and/or the assertiveness score threshold may be decreased, and/or the negotiation score may be used to scale the intent score and/or the assertiveness score themselves, which may cause the intent score and/or the assertiveness score to be reduced.

At operation 510, example process 500 may comprise determining a scene intensity based at least in part on the assertiveness score, intent score, negotiation score, and/or collaboration score, according to any of the techniques discussed herein. The scene intensity may indicate a general aggressiveness and/or assertiveness of maneuvers being executed by entities in an area. For example, in areas and/or times of day where drivers are more aggressive, the determined negotiation score may be lower and the collaboration score may be lower and/or negative, indicating that entities are not basing their actions on other entities' behavior, are not paying attention, and/or are asserting their right of way, potentially even when the other entities do not have the right of way. In such an example, a scene intensity may be higher than in a situation where the negotiation score and/or collaboration score is higher, indicating other entities appear to basing their behavior on other entities' behavior, etc. In some examples, the negotiation component may associate the negotiation score, etc., with a geographical region, a time of day, or the like and may average the negotiation score and/or collaboration score over different observations associated with a same geographical region or a similar time of day (e.g., morning, afternoon, evening, night, 8-10 am, 4-6 pm).

At operation 512, example process 500 may comprise altering an operating configuration of the autonomous vehicle based at least in part on the intensity, according to any of the techniques discussed herein. For example, an intensity may be associated with a set of gains, safety tolerances, and/or negotiation thresholds. Multiple intensities determined based on one or more autonomous vehicle's recording of intensities and/or negotiation data associated with different times, regions, etc. may be stored in a data structure with associated operating configurations. The autonomous vehicle may interpolate between one of these values based at least in part on the intensity score determined at operation 330 and/or sensor data indicating a location of the autonomous vehicle, a time of day, day of the week, and/or the like. Altering the operating configuration may comprise increasing or lowering safety tolerances, the negotiation thresholds discussed herein, and/or gains associated with the drive system (e.g., maximum acceleration, velocity, jerk parameters). The higher the collaboration score, the more that safety tolerances may be reduced, at least to a lower bound below which the safety tolerances may not be reduced. This may have the effect of removing the ambiguity of whether the autonomous vehicle should go or not in a double-parked vehicle situation where there is oncoming traffic, when two vehicles arrive at a junction simultaneously, or the like.

In an additional or alternate example, the scene intensity may be used as part of semi-unsupervised machine-learned model training techniques and/or to evaluate updates to the planning component. For example, the vehicle 102 may be configured with the goal of staying at least a minimum distance from other objects. In some examples, if the vehicle 102 comes closer to another object than the minimum distance, the machine-learned model and/or the planning component may be penalized. However, if the scene intensity is high, it may have been necessary for the vehicle 102 to come that close and/or other objects may be coming that close to each other. Therefore the scene intensity may be used to indicate that the machine-learned model and/or the planning component should not be penalized.

At operation 514, example process 500 may comprise determining whether the intent score and/or assertiveness score associated with the proposed trajectory satisfies the intent score threshold, assertiveness score threshold, and/or safety tolerance respectively, according to any of the techniques discussed herein. In at least some examples, a collision avoidance component may check to ensure that the proposed trajectory satisfies the safety tolerance(s), which may be modified at operation 332 depending on the intensity of the scene and/or based on the negotiation score and/or collaboration score. This may cause the autonomous vehicle to be able to get around a double-parked vehicle without overly conservatively waiting for a vehicle to pass that appears to be allowing the autonomous vehicle to cross into the lane occupied by that vehicle. Since the intent score threshold and/or assertiveness score threshold may be altered based at least in part on detecting particular object classes (e.g., pedestrians, cyclists, emergency vehicle) or a state associated therewith (e.g., pedestrian looking at phone), operation 334 may have the effect at ensuring a trajectory with a high intent score and/or low or even negative assertiveness score is chosen. If the intent score and/or the assertiveness score determined in association with the proposed trajectory do not satisfy the threshold(s) and/or safety tolerance(s) discussed herein, example process 300 may return to operation 326 to select a new proposed trajectory. On the other hand, if the intent score and/or the assertiveness score satisfy the threshold(s) and/or safety tolerance(s), the example process 300 may continue to operation 336.

At operation 516, example process 500 may comprise controlling the autonomous vehicle based at least in part on the proposed trajectory, according to any of the techniques discussed herein.

Example Assertiveness Score Graphs

Figure 6:
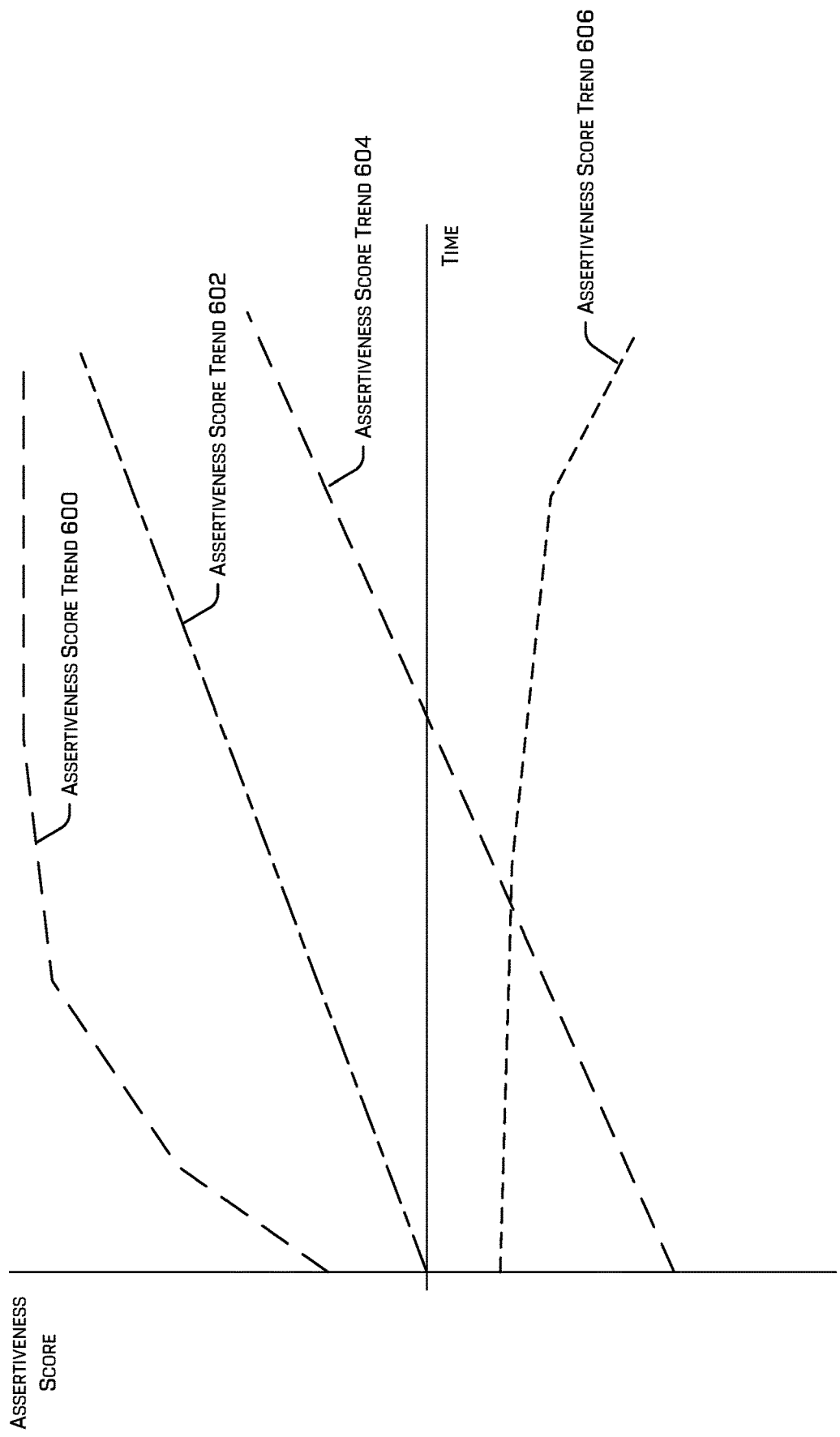

FIGS. 6 and 7 illustrate graphs of assertiveness scores over time for different scenarios. The assertiveness score trends depicted in FIGS. 6 and 7 may be examples of assertiveness scores generated over time in association with different entities and/or situations or different entities during a same scenario.

Turning to FIG. 6, assertiveness score trend 600 may be associated with an entity that is taking charge of negotiating a scene. The entity establishes early on that the entity is taking possession of the right of way and will continue to do so.

Assertiveness score trend 602 may be associated with an entity that is generally assertive.

Assertiveness score trend 604 may be associated with an entity that is ultra assertive. This may be the case where an entity formerly appeared to be giving the autonomous vehicle the right of way and yet quickly switched to asserting the right of way.

Assertiveness score trend 606 may be associated with an entity that is not paying attention but is a low risk of collision.

Turning to FIG. 7, assertiveness score trend 700 may be associated with an entity that is not paying attention but is at a high or increasingly high risk of collision.

Assertiveness score trend 702 may be associated with an entity that is giving way to the autonomous vehicle. Despite formerly asserting or having the right of way, the entity appears to be turning the right of way over to the autonomous vehicle.

Assertiveness score trend 704 may be associated with an entity that is ultra conservative and assertiveness score trend 706 may be associated with an entity that is conservative.

Example Clauses

A. A method comprising: receiving a track associated with an autonomous vehicle, the track comprising information indicative of previous behavior of the autonomous vehicle; receiving sensor data associated with an object in an environment surrounding the autonomous vehicle; determining, based at least in part on the sensor data, a candidate trajectory for controlling the autonomous vehicle; determining, based at least in part on the track and the candidate trajectory, an intent score associated with the autonomous vehicle, the intent score indicative of an ability of the object to recognize an intended action of the autonomous vehicle; determining, based at least in part on the sensor data and the candidate trajectory, an assertiveness score associated with the object or the autonomous vehicle, the assertiveness score indicative of a maneuver required by the object to safely negotiate the autonomous vehicle executing an intended action associated with the candidate trajectory; controlling the autonomous vehicle based at least in part on at least one of the intent score or the assertiveness score.

B. The method of paragraph A, wherein determining the intent score is based at least in part on determining a predicted trajectory associated with the autonomous vehicle and a probability associated with the predicted trajectory.

C. The method of either paragraph A or B, wherein determining the assertiveness score comprises: receiving an object track associated with the object, the object track identifying previous behaviors exhibited by the object; and determining, based at least in part on the object track and the candidate trajectory, a predicted trajectory associated with the object that would avoid collision with the autonomous vehicle, wherein determining the assertiveness score is further based at least in part on one or more of an acceleration, a discomfort metric, or a jerk associated with the predicted trajectory.

D. The method of any one of paragraphs A-C, further comprising: determining, based at least in part on the intent score and the assertiveness score, at least one of a collaboration score or a negotiation score, wherein: the collaboration score indicates a likelihood that the object is yielding a right of way to the autonomous vehicle, and the negotiation score indicates a likelihood that changes to a state of the object are responsive to actions taken by the autonomous vehicle.

E. The method of paragraph D, wherein determining the collaboration score and the negotiation score comprises: determining a line fitting based at least in part on a change of assertiveness scores associated with the object over time and a change of intent scores associated with the autonomous vehicle over time; determining, as the collaboration score, a slope or coefficients of the line; and determining, as the negotiation score, a residual of the line to the change of assertiveness scores and the change of intent scores over time.

F. The method of either paragraph D or E, further comprising: controlling the autonomous vehicle based at least in part on determining to use a trajectory from among a plurality of trajectories generated by the autonomous vehicle; and wherein: determining to use the trajectory is based at least in part on at least one of a negotiation threshold and a collaboration threshold associated with the trajectory; and the method further comprises: receiving sensor data indicating an object in an environment surrounding the autonomous vehicle; receiving an object classification associated with the sensor data; and altering at least one of the negotiation threshold or the collaboration threshold based at least in part on the object classification.

G. A system comprising: one or more processors; and memory storing processor-executable instructions that, when executed by the one or more processors, cause the system to perform operations comprising: receiving a track associated with an autonomous vehicle, the track comprising information indicative of previous behavior of the autonomous vehicle; receiving sensor data associated with an object in an environment surrounding the autonomous vehicle; determining, based at least in part on the sensor data, a candidate trajectory for controlling the autonomous vehicle; determining, based at least in part on the track and the candidate trajectory, an intent score associated with the autonomous vehicle, the intent score indicative of an ability of the object to recognize an intended action of the autonomous vehicle; determining, based at least in part on the sensor data and the candidate trajectory, an assertiveness score associated with the object or the autonomous vehicle, the assertiveness score indicative of a maneuver required by the object to safely negotiate the autonomous vehicle executing an intended action associated with the candidate trajectory; controlling the autonomous vehicle based at least in part on at least one of the intent score or the assertiveness score.

H. The system of paragraph G, wherein determining the intent score is based at least in part on determining a predicted trajectory associated with the autonomous vehicle and a probability associated with the predicted trajectory.

I. The system of either paragraph G or H, wherein determining the assertiveness score comprises: receiving an object track associated with the object, the object track identifying previous behaviors exhibited by the object; and determining, based at least in part on the object track and the candidate trajectory, a predicted trajectory associated with the object that would avoid collision with the autonomous vehicle, wherein determining the assertiveness score is further based at least in part on one or more of an acceleration, a discomfort metric, or a jerk associated with the predicted trajectory.

J. The system of any one of paragraphs G-I, wherein the operations further comprise: determining, based at least in part on the intent score and the assertiveness score, at least one of a collaboration score or a negotiation score, wherein: the collaboration score indicates a likelihood that the object is yielding a right of way to the autonomous vehicle, and the negotiation score indicates a likelihood that changes to a state of the object are responsive to actions taken by the autonomous vehicle.

K. The method of paragraph J, wherein determining the collaboration score and the negotiation score comprises: determining a line fitting based at least in part on a change of assertiveness scores associated with the object over time and a change of intent scores associated with the autonomous vehicle over time; determining, as the collaboration score, a slope or coefficients of the line; and determining, as the negotiation score, a residual of the line to the change of assertiveness scores and the change of intent scores over time.

L. The system of either paragraph J or K, wherein the operations further comprise controlling the autonomous vehicle based at least in part on the negotiation score based at least in part on scaling at least one of the assertiveness score or the intent score based at least in part on the negotiation score or scaling a threshold associated with the assertiveness score or the intent score.

M. The system of any one of paragraphs J-L, wherein the operations further comprise: controlling the autonomous vehicle based at least in part on determining to use a trajectory from among a plurality of trajectories generated by the autonomous vehicle; and wherein: determining to use the trajectory is based at least in part on at least one of a negotiation threshold and a collaboration threshold associated with the trajectory; and the operations further comprise: receiving sensor data indicating an object in an environment surrounding the autonomous vehicle; receiving an object classification associated with the sensor data; and altering at least one of the negotiation threshold or the collaboration threshold based at least in part on the object classification.

N. A non-transitory computer-readable medium storing processor-executable instructions that, when executed by the one or more processors, cause the one or more processors to perform operations comprising: receiving a track associated with an autonomous vehicle, the track comprising information indicative of previous behavior of the autonomous vehicle; receiving sensor data associated with an object in an environment surrounding the autonomous vehicle; determining, based at least in part on the sensor data, a candidate trajectory for controlling the autonomous vehicle; determining, based at least in part on the track and the candidate trajectory, an intent score associated with the autonomous vehicle, the intent score indicative of an ability of the object to recognize an intended action of the autonomous vehicle; determining, based at least in part on the sensor data and the candidate trajectory, an assertiveness score associated with the object or the autonomous vehicle, the assertiveness score indicative of a maneuver required by the object to safely negotiate the autonomous vehicle executing an intended action associated with the candidate trajectory; controlling the autonomous vehicle based at least in part on at least one of the intent score or the assertiveness score.

O. The non-transitory computer-readable medium of paragraph N, wherein determining the intent score is based at least in part on determining a predicted trajectory associated with the autonomous vehicle and a probability associated with the predicted trajectory.

P. The non-transitory computer-readable medium of either paragraph N or O, wherein determining the assertiveness score comprises: receiving an object track associated with the object, the object track identifying previous behaviors exhibited by the object; and determining, based at least in part on the object track and the candidate trajectory, a predicted trajectory associated with the object that would avoid collision with the autonomous vehicle, wherein determining the assertiveness score is further based at least in part on one or more of an acceleration, a discomfort metric, or a jerk associated with the predicted trajectory.

Q. The non-transitory computer-readable medium of any one of paragraphs N-P, wherein the operations further comprise: determining, based at least in part on the intent score and the assertiveness score, at least one of a collaboration score or a negotiation score, wherein: the collaboration score indicates a likelihood that the object is yielding a right of way to the autonomous vehicle, and the negotiation score indicates a likelihood that changes to a state of the object are responsive to actions taken by the autonomous vehicle.

R. The non-transitory computer-readable medium of paragraph Q, wherein determining the collaboration score and the negotiation score comprises: determining a line fitting based at least in part on a change of assertiveness scores associated with the object over time and a change of intent scores associated with the autonomous vehicle over time; determining, as the collaboration score, a slope or coefficients of the line; and determining, as the negotiation score, a residual of the line to the change of assertiveness scores and the change of intent scores over time.

S. The non-transitory computer-readable medium of either paragraph Q or R, wherein the operations further comprise controlling the autonomous vehicle based at least in part on the negotiation score based at least in part on scaling at least one of the assertiveness score or the intent score based at least in part on the negotiation score or scaling a threshold associated with the assertiveness score or the intent score.

T. The non-transitory computer-readable medium of any one of paragraphs Q-S, wherein the operations further comprise: controlling the autonomous vehicle based at least in part on determining to use a trajectory from among a plurality of trajectories generated by the autonomous vehicle; and wherein: determining to use the trajectory is based at least in part on at least one of a negotiation threshold and a collaboration threshold associated with the trajectory; and the operations further comprise: receiving sensor data indicating an object in an environment surrounding the autonomous vehicle; receiving an object classification associated with the sensor data; and altering at least one of the negotiation threshold or the collaboration threshold based at least in part on the object classification.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving a track associated with an autonomous vehicle, the track comprising information indicative of previous behavior of the autonomous vehicle;
   receiving sensor data associated with an object in an environment surrounding the autonomous vehicle;
   determining, based at least in part on the sensor data, a candidate trajectory for controlling the autonomous vehicle;
   determining, based at least in part on the track and the candidate trajectory, an intent score associated with the autonomous vehicle, the intent score indicative of whether a predicted behavior of the autonomous vehicle, from the perspective of the object, diverges from the candidate trajectory;
   determining, based at least in part on the sensor data and the candidate trajectory, an assertiveness score associated with the object or the autonomous vehicle, the assertiveness score indicative of a maneuver required by the object to safely negotiate the autonomous vehicle executing an intended action associated with the candidate trajectory,
   wherein determining the assertiveness score is further based at least in part on:
      receiving an object track associated with the object, the object track identifying previous behaviors exhibited by the object; and
      determining, based at least in part on the object track and the candidate trajectory, a predicted trajectory associated with the object that would avoid collision with the autonomous vehicle,
      wherein determining the assertiveness score is further based at least in part on one or more of an acceleration, a discomfort metric, or a jerk associated with the predicted trajectory; and
   controlling the autonomous vehicle based at least in part on at least one of the intent score or the assertiveness score.

2. The method of claim 1, wherein determining the intent score is based at least in part on determining a predicted trajectory associated with the autonomous vehicle and a probability associated with the predicted trajectory.

3. The method of claim 1, further comprising:
   determining, based at least in part on the intent score and the assertiveness score, at least one of a collaboration score or a negotiation score, wherein:
   the collaboration score indicates a likelihood that the object is yielding a right of way to the autonomous vehicle, and
   the negotiation score indicates a likelihood that changes to a state of the object are responsive to actions taken by the autonomous vehicle.

4. The method of claim 3, wherein determining the collaboration score and the negotiation score comprises:
   determining a line fitting based at least in part on a change of assertiveness scores associated with the object over time and a change of intent scores associated with the autonomous vehicle over time;
   determining, as the collaboration score, a slope or coefficients of the line fitting; and
   determining, as the negotiation score, a residual of the line fitting to the change of assertiveness scores and the change of intent scores over time.

5. The method of claim 3, further comprising:
controlling the autonomous vehicle based at least in part on determining to use a trajectory from among a plurality of trajectories generated by the autonomous vehicle; and wherein:
determining to use the trajectory is based at least in part on at least one of a negotiation threshold and a collaboration threshold associated with the trajectory; and the method further comprises:
receiving sensor data indicating an object in an environment surrounding the autonomous vehicle;
receiving an object classification associated with the sensor data; and
altering at least one of the negotiation threshold or the collaboration threshold based at least in part on the object classification.

6. A system comprising:
one or more processors; and
memory storing processor-executable instructions that, when executed by the one or more processors, cause the system to perform operations comprising:
receiving a track associated with an autonomous vehicle, the track comprising information indicative of previous behavior of the autonomous vehicle;
receiving sensor data associated with an object in an environment surrounding the autonomous vehicle;
determining, based at least in part on the sensor data, a candidate trajectory for controlling the autonomous vehicle;
determining, based at least in part on the track and the candidate trajectory, an intent score associated with the autonomous vehicle, the intent score indicative of how clear it is to the object that the autonomous vehicle will perform the candidate trajectory;
determining, based at least in part on the sensor data and the candidate trajectory, an assertiveness score associated with the object or the autonomous vehicle, the assertiveness score indicative of a maneuver required by the object to safely negotiate the autonomous vehicle executing an intended action associated with the candidate trajectory,
wherein determining the assertiveness score is further based at least in part on:
receiving an object track associated with the object, the object track identifying previous behaviors exhibited by the object; and
determining, based at least in part on the object track and the candidate trajectory, a predicted trajectory associated with the object that would avoid collision with the autonomous vehicle,
wherein determining the assertiveness score is further based at least in part on one or more of an acceleration, a discomfort metric, or a jerk associated with the predicted trajectory; and
controlling the autonomous vehicle based at least in part on at least one of the intent score or the assertiveness score.

7. The system of claim 6, wherein determining the intent score is based at least in part on determining a predicted trajectory associated with the autonomous vehicle and a probability associated with the predicted trajectory.

8. The system of claim 6, wherein the operations further comprise:
determining, based at least in part on the intent score and the assertiveness score, at least one of a collaboration score or a negotiation score, wherein:
the collaboration score indicates a likelihood that the object is yielding a right of way to the autonomous vehicle, and
the negotiation score indicates a likelihood that changes to a state of the object are responsive to actions taken by the autonomous vehicle.

9. The system of claim 8, wherein determining the collaboration score and the negotiation score comprises:
determining a line fitting based at least in part on a change of assertiveness scores associated with the object over time and a change of intent scores associated with the autonomous vehicle over time;
determining, as the collaboration score, a slope or coefficients of the line fitting; and
determining, as the negotiation score, a residual of the line fitting to the change of assertiveness scores and the change of intent scores over time.

10. The system of claim 8, wherein the operations further comprise controlling the autonomous vehicle based at least in part on the negotiation score based at least in part on scaling at least one of the assertiveness score or the intent score based at least in part on the negotiation score or scaling a threshold associated with the assertiveness score or the intent score.

11. The system of claim 8, wherein the operations further comprise:
controlling the autonomous vehicle based at least in part on determining to use a trajectory from among a plurality of trajectories generated by the autonomous vehicle; and wherein:
determining to use the trajectory is based at least in part on at least one of a negotiation threshold and a collaboration threshold associated with the trajectory; and the operations further comprise:
receiving sensor data indicating an object in an environment surrounding the autonomous vehicle;
receiving an object classification associated with the sensor data; and
altering at least one of the negotiation threshold or the collaboration threshold based at least in part on the object classification.

12. A non-transitory computer-readable medium storing processor-executable instructions that, when executed by one or more processors, cause the one or more processors to perform operations comprising:
receiving a track associated with an autonomous vehicle, the track comprising information indicative of previous behavior of the autonomous vehicle;
receiving sensor data associated with an object in an environment surrounding the autonomous vehicle;
determining, based at least in part on the sensor data, a candidate trajectory for controlling the autonomous vehicle;
determining, based at least in part on the track and the candidate trajectory, an intent score associated with the autonomous vehicle, the intent score indicative of how clear it is to the object that the autonomous vehicle will perform the candidate trajectory;
determining, based at least in part on the sensor data and the candidate trajectory, an assertiveness score associated with the object or the autonomous vehicle, the assertiveness score indicative of a maneuver required by the object to safely negotiate the autonomous vehicle executing an intended action associated with the candidate trajectory, wherein determining the assertiveness score is further based at least in part on:

receiving an object track associated with the object, the object track identifying previous behaviors exhibited by the object; and determining, based at least in part on the object track and the candidate trajectory, a predicted trajectory associated with the object that would avoid collision with the autonomous vehicle, wherein determining the assertiveness score is further based at least in part on one or more of an acceleration, a discomfort metric, or a jerk associated with the predicted trajectory; and controlling the autonomous vehicle based at least in part on at least one of the intent score or the assertiveness score.

13. The non-transitory computer-readable medium of claim 12, wherein determining the intent score is based at least in part on determining a predicted trajectory associated with the autonomous vehicle and a probability associated with the predicted trajectory.

14. The non-transitory computer-readable medium of claim 12, wherein the operations further comprise:

determining, based at least in part on the intent score and the assertiveness score, at least one of a collaboration score or a negotiation score, wherein:

the collaboration score indicates a likelihood that the object is yielding a right of way to the autonomous vehicle, and the negotiation score indicates a likelihood that changes to a state of the object are responsive to actions taken by the autonomous vehicle.

15. The non-transitory computer-readable medium of claim 14, wherein determining the collaboration score and the negotiation score comprises:

determining a line fitting based at least in part on a change of assertiveness scores associated with the object over time and a change of intent scores associated with the autonomous vehicle over time;

determining, as the collaboration score, a slope or coefficients of the line fitting; and determining, as the negotiation score, a residual of the line fitting to the change of assertiveness scores and the change of intent scores over time.

16. The non-transitory computer-readable medium of claim 14, wherein the operations further comprise controlling the autonomous vehicle based at least in part on the negotiation score based at least in part on scaling at least one of the assertiveness score or the intent score based at least in part on the negotiation score or scaling a threshold associated with the assertiveness score or the intent score.

17. The non-transitory computer-readable medium of claim 14, wherein the operations further comprise:

controlling the autonomous vehicle based at least in part on determining to use a trajectory from among a plurality of trajectories generated by the autonomous vehicle; and wherein:

determining to use the trajectory is based at least in part on at least one of a negotiation threshold and a collaboration threshold associated with the trajectory; and the operations further comprise:

receiving sensor data indicating an object in an environment surrounding the autonomous vehicle;

receiving an object classification associated with the sensor data; and altering at least one of the negotiation threshold or the collaboration threshold based at least in part on the object classification.

\* \* \* \* \*